US010520217B2

(12) United States Patent
Etscheid et al.

(10) Patent No.: US 10,520,217 B2
(45) Date of Patent: Dec. 31, 2019

(54) ASSEMBLED HEATABLE MEDIA LINE COMPRISING A MEDIA LINE HAVING AT LEAST TWO HEATING ELEMENTS ARRANGED ON THE EXTERIOR THEREOF, AND METHOD FOR THE PRODUCTION THEREOF (71) Applicant: VOSS AUTOMOTIVE GMBH, Wipperfürth (DE)

(72) Inventors: Tobias Etscheid, Lindlar (DE); Otfried Schwarzkopf, Kürten (DE); Marco Isenburg, Ratingen (DE)

(73) Assignee: VOSS AUTOMOTIVE GMBH, Wipperfurth (DE)

( * ) Notice: Subject to any disclaimer, the term of this patent is extended or adjusted under 35 U.S.C. 154(b) by 233 days.

(21) Appl. No.: 14/363,329

(22) PCT Filed: Dec. 6, 2012

(86) PCT No.: PCT/EP2012/005028
§ 371 (c)(1),
(2) Date: Jun. 6, 2014

(87) PCT Pub. No.: WO2013/083273
PCT Pub. Date: Jun. 13, 2013

(65) Prior Publication Data
US 2014/0321841 A1 Oct. 30, 2014

(30) Foreign Application Priority Data

Dec. 7, 2011 (DE) .................. 10 2011 120 357

(51) Int. Cl.
*F24H 1/10* (2006.01)
*H01C 17/04* (2006.01)
(Continued)

(52) U.S. Cl.
CPC ............. *F24H 1/102* (2013.01); *H01C 17/02* (2013.01); *H01C 17/04* (2013.01); *H05B 3/06* (2013.01);
(Continued)

(58) Field of Classification Search
CPC .......... F24H 1/102; F24H 1/009; F24H 1/142; H05B 3/06; H05B 3/58; H01C 17/02; H01C 17/04
(Continued)

(56) References Cited

U.S. PATENT DOCUMENTS 4,553,023 A 11/1985 Jameson et al.
5,704,113 A * 1/1998 Mak .................... B29C 45/2737
219/421
(Continued)

FOREIGN PATENT DOCUMENTS

CN 103180654 A 6/2013
DE 20 2008 003 908 U1 9/2009
(Continued)

*Primary Examiner* — Ibrahime A Abraham
*Assistant Examiner* — Justin C Dodson
(74) *Attorney, Agent, or Firm* — Hudak, Shunk & Farine Co. LPA (57) ABSTRACT An assembled heatable media line having a media line having at least two heating elements arranged on the exterior of the media line and at least one line connector. In order to heat the at least one line connector, only one of the heating elements is arranged at or on said line connector and at least partially surrounds the same.

15 Claims, 3 Drawing Sheets (51) Int. Cl.
*H01C 17/02* (2006.01)
*H05B 3/58* (2006.01)
*H05B 3/06* (2006.01)

(52) U.S. Cl.
CPC .......... *H05B 3/58* (2013.01); *Y10T 29/49083* (2015.01); *Y10T 29/49096* (2015.01)

(58) Field of Classification Search
USPC ................ 392/468, 472, 478, 479, 480, 481
See application file for complete search history.

(56) References Cited

U.S. PATENT DOCUMENTS

| | | | | |
|---|---|---|---|---|
| 2005/0084255 | A1* | 4/2005 | Kertesz | H05B 3/58 392/480 |
| 2006/0263074 | A1* | 11/2006 | Xing | A61F 7/007 392/407 |
| 2007/0212037 | A1* | 9/2007 | Koenekamp | F16L 11/121 392/468 |
| 2007/0278210 | A1* | 12/2007 | Weiss | B60N 2/5685 219/508 |
| 2009/0304372 | A1* | 12/2009 | Gubler | F24H 3/0405 392/478 |
| 2010/0253067 | A1* | 10/2010 | Isenburg | F16L 53/38 285/41 |
| 2010/0290764 | A1* | 11/2010 | Borgmeier | F16L 25/01 392/468 |
| 2011/0006513 | A1* | 1/2011 | Lechner | F16L 25/01 285/122.1 |
| 2011/0073585 | A1* | 3/2011 | Sinault | F16L 25/01 219/541 |
| 2013/0163970 | A1 | 6/2013 | Schwarzkopf et al. | |

FOREIGN PATENT DOCUMENTS

| | | |
|---|---|---|
| DE | 10 2008 059 751 A1 | 6/2010 |
| DE | 20 2009 003 807 U1 | 9/2010 |
| EP | 1 985 908 A1 | 10/2008 |
| WO | 2009/080501 A1 | 7/2009 |

* cited by examiner

ASSEMBLED HEATABLE MEDIA LINE COMPRISING A MEDIA LINE HAVING AT LEAST TWO HEATING ELEMENTS ARRANGED ON THE EXTERIOR THEREOF, AND METHOD FOR THE PRODUCTION THEREOF

FIELD OF THE INVENTION

The invention relates to an assembled heatable media line having a media line with at least two heating elements arranged on the exterior thereof and having at least one line connector and to a method for producing such a heatable media line, comprising the media line, at least one line connector and at least two heating elements.

BACKGROUND OF THE INVENTION

Heatable media lines of this type and methods for the production thereof are known from the prior art. In vehicles in particular, a series of media lines are provided for conveying mostly fluid media. These media lines are susceptible to freezing at low temperatures, for which reason a heating system is provided. Line connectors are used for connecting at least two media pipelines or for the connector connection of a media pipeline to a desired assembly. Often such media as tend to freeze even at still quite high environmental temperatures, owing to a relatively high freezing point, are conveyed through the media pipelines, as a result of which the functionality, for example, of a vehicle may be impaired or even disturbed considerably. This is particularly apparent in the case of water lines for windscreen-washing systems, just as in the case of media lines, through which an aqueous carbamide solution flows as a medium that is used as an $NO_x$ reaction additive for diesel engines with so-called SCR catalytic converters.

EP 1 985 908 A1 discloses a line connector for media lines, which consists of a connector piece having a terminal section for terminal connection to the media line or to an assembly and having a transition section, which bounds the terminal section and has a flow duct. Electrical heating means are provided in an arrangement that at least partially encloses the flow duct, at least in the region of the transition section. The electrical heating means that are thus arranged in the transition section, that is, outside the terminal section, act to prevent freezing of the medium in question inside the connection piece or to rectify it by thawing of the frozen medium. The heating wire surrounds the connector piece in a wound, coil-like manner on the outside, at least one further coil winding being arranged in the inner region in the region of the flow duct, so that an induction is provided in the inner coil winding to produce heat when a current flows through the outer heating wire. The media line consists of an inner pipeline having a heating conductor arranged on the circumference, pipeline and heating conductor being enclosed by an outer sheath such as a corrugated tube. Line connectors are attached to both ends of the media line. An adhesive tape is wound around the heating conductor arranged on the pipeline, which is thereby fixed to the pipeline, before the corrugated tube is joined on. Alternatively, it is proposed that a varnish or adhesive layer be provided for fixing. The heating wires of the line connectors and the heating line of the pipeline are electrically connected to each other, in each case the heating wire of one of the line connectors being electrically series-connected to one of the winding wires of the heating line surrounding the pipeline and the terminal ends of the two series circuits being routed outwards at the two line connectors, where a connection to a voltage supply or a further connection is provided. Alternatively it is disclosed that the heating wires of the line connectors and of the windings surrounding the pipeline, as an electrical series circuit of all the heating wires, are provided with only one outer line terminal.

If a plurality of heating elements is routed along a media line and line connectors connected to the end of the latter, it can result in an excessively high heating power being produced, in particular at the line connectors. Heating conductors are usually adapted to the relevant media line and the power requirement thereof in terms of the strand selection and pitch etc. If the strand or strands or heating elements on the media line and the line connector are identical, the power input at the line connector is produced to a particular extent depending on the line length. In this case, the problem arises, in particular in the case of short lines, that too much power is coupled in, or also if heating filaments are used. A line connector only offers a few possibilities of varying the fastening of the heating conductors, since winding and fastening, that is, the distribution of the heating conductors on the line connectors, the number of windings, which is at least one or two, the positioning of a crimp connection, which is arranged in a housing surrounding the line connector, usually take place relatively uniformly for cost reasons. Even a possible fastening structure, for example a rib structure, on the outside of the line connector for fastening the heating conductors is usually formed identically in most line connectors. For short or very short lines of in particular less than one metre, the provision of a heating filament can be sensible. It would therefore be desirable to provide a measure that permits in particular the end line connectors of a heatable media line to be loaded with a lower heating power.

The present invention is therefore based on the object of creating an assembled heatable media line and a method for the production thereof, with which it is possible to achieve optimal heating power in relation to the medium conducted through the heatable media line having end line connectors, in particular in the region of the at least one end line connector.

SUMMARY OF THE INVENTION

The object is achieved for an assembled heatable media line having a media line with at least two heating elements arranged on the exterior thereof and having at least one line connector in that, in order to heat the at least one line connector, only one of the heating elements is arranged at or on the latter such that it at least partially surrounds the same. For a method for producing such a media line, the object is achieved in that the media line is pre-assembled continuously with the heating elements wound, the heating elements being fastened or fixed on the media line by means of at least one fastening means, the media line being cut in a use-specific manner to a first length corresponding to the desired media line length plus an allowance length, which bears the heating element length necessary for winding the at least one line connector and a transition region between the media line and the line connector, the fastening means in the media line section corresponding to the allowance length being removed, the heating element being unwound from the media line section corresponding to the allowance length, the media line being cut to the desired media line length to form a second media line section, one of the heating elements being shortened before or after the second cutting of the media line, the second media line section being connected to the at least one line connector, and the unshortened heating element being wound around the at least one line connector. Developments of the invention are defined in the dependent claims.

An assembled heatable media line, in which only one of the at least two heating elements is used to heat a line connector and the medium conducted through it is thereby created. A lower heating power or heat supply to the line connector can be provided thereby. With the otherwise usual winding of at least two heating elements, which extend along the media line, around the line connectors, it is possible for an excessively large amount of heat to be introduced into the line connector. This can be avoided by winding only one heating element around the least one line connector. Although at least two heating elements are arranged along the media line, only one of these is arranged at or on the at least one end line connector. When the one heating element is shortened, a degree of freedom is more possible during the configuration of the heatable media line, since the heating power introduced into the line connector can be varied by the arrangement of the only one heating element on the latter in addition to the other variation possibilities of the selection of the resistance of the heating elements and the length thereof. The heating elements could have different resistances, so that variation of the heating power is also possible thereby at the line connectors, since in each case the heating element that produces the desired heating power can be used there for arrangement on the line connector. The selection of the heating elements can thus also be made in a use-specific manner in relation to the resistance thereof.

The media line can be formed in a hose-like manner, in particular from an elastomer or compound material, e.g. as an EPDM (ethylene-propylene-diene monomer) hose line, and/or in a pipe-like manner, in particular as a polyamide pipeline, e.g. from polyamide 12. Heating elements mean in the present case a wide variety of means for introducing heat, that is, for heating the media line and the end line connectors. Heating elements mean in particular heating conductors, heating strands and heating wires, heating conductors meaning thermally conductive elements that effect a heat transfer into one layer. They include heating filaments, which for their part comprise an inner fibre and wires wound around the latter. Heating strands mean in this case both individual heating wires and also a number of combined heating wires, it being possible for the respective heating wire or number of combined heating wires to be provided with or without an insulating sheath.

The heating element can furthermore comprise at least one heating filament having at least two heating wire strands. Heating elements in the form of heating filaments are particularly suitable for short assembled lines having a length of less than 2 m. Heating filaments are formed by providing an inner fibre or core, around which at least one wire is wound, in particular two heating wire strands. When the different heating elements are series-connected to heat the media line and the line connectors, a line length of less than 2 m affects the heating power coupling into the line connector. The heating power at the line connector is not variable but the media line length varies greatly. Therefore, it can be sensible with short media lines to increase the heating wire length in the media line, for example by arrangement in the form of a helix. Instead of providing only one heating filament, e.g. two heating filaments can also be used.

The heating element, which is provided for arrangement on the at least one line connector, advantageously projects with a greater length over the end face of the media line than the at least one further heating element. This can be done by correspondingly shortening the at least one further heating element. At least the section that projects over the end face of the line connector when the heatable media line is produced or when the heating elements are unwound again from the line connector therefore has a greater length in the heating element provided for winding around the line connector than the corresponding section of the other heating element. The heating element that projects further over the end face of the line connector is provided for winding around or for arrangement on the line connector and for heating and is therefore the only heating element provided for heating the line connector.

The media line provided, in particular wound, with the heating elements is cut to a first length, the first length corresponding to the desired later final length of the media line plus an allowance length. The allowance length depends on the wound length of the heating element that is necessary to wind around the at least one line connector. After the first cutting to length, the fastening means that fixes the heating elements on the media line is removed in the media line section of the allowance length. An adhesive, fabric or adhesive-fabric tape can for example be used as the fastening means. After the fastening means has been removed, the heating elements can be unwound from the media line section arranged in the region of the allowance length and the heating element(s) not provided for winding around the line connector can be shortened or cut off. Only the one heating element provided for winding around the line connector still has the desired excess length, which therefore has a length difference from the other heating element(s). The media line is then shortened by the allowance length, the line connector(s) is/are arranged on the end(s) of the media line and connected to the latter, and the one now longer heating element is arranged on the at least one line connector. Depending on the use, it is possible for only one line connector to be provided with only one heating element and the other end line connector of the media line to be provided with two or even more heating elements. However, it is also possible for both end line connectors to be provided, in particular wound, with only one of the heating elements in each case.

The pitch of the winding on the media line can vary section by section, it being possible for the heating elements to be wound around the media line with a shallower pitch in some sections than in the remaining winding region. In particular, the pitch of the winding on the media line can be 10 to 40 mm, in particular 20 to 30 mm. Preferred line diameters are for example 4×1 mm, 5×1 mm and 8×1 mm. To improve the ability of the heating power to be influenced between the media line and the at least one line connector, three heating elements, in particular heating strands, can be provided along the assembled media line, one heating element being arranged on the one line connector and two being arranged along the media line, one of the two heating elements that are routed along the media line being used for arrangement on the other line connector. In the so-called hot region or warmer region of a heatable media line, which is arranged in the vicinity of apparatuses that give out a lot of heat, such as an engine or exhaust train, the thermal radiation present there can often heat the medium flowing through the heatable media line and is therefore sufficient to thaw the same at low ambient temperatures outside a vehicle. Intensive heating of the media line and of the line connectors thereof is only provided in the region of the heatable media line that is at a distance from such a heat source, the so-called cold region, e.g. in the vicinity of a tank of a vehicle. With such a configuration, three heating elements can therefore be provided, one separate heating element being arranged on the line connector in the cold region and two being arranged along the media line, of which one is shortened at the end and the other, then comparatively longer heating element is used for arrangement on the other line connector in the hot region.

If there are only two heating elements, in particular heating strands, the pitch can be 19 to 21 mm with a line diameter of 8×1 mm, 19 to 23 mm with a line diameter of 5×1 mm and 22 to 29 mm with a line diameter of 4×1 mm. If only two heating elements are provided along the entire assembled heatable media line, no variation in heating power between the media line and the line connectors is possible, but if four heating elements are provided, the heating power can by contrast be adjusted as desired. To improve the ability of the heating power to be influenced between the media line and the at least one line connector, therefore, four heating elements, in particular heating strands, are provided.

The heating power of the heating elements along the media line is advantageously 20 to 8 W/m, in particular 14 W/m, and at the at least one line connector 1 to 4 W, in particular 1.5 W. This different heating power along the media line and at the line connectors can be achieved by arranging only one heating element at the line connector. The heating element can be wound in a spiral or meandering manner around the line connector or arranged in an elongate manner around the line connector.

The heating elements of the heatable media line can be connected in series and/or in parallel. The heating elements can be left open or be electrically connected in series or in parallel to each other and/or to a lead and/or to a bridging element and/or to a filling element. The ends of the heating elements can thus be electrically connected to leads and/or reinforced by means of at least one filling element and electrically connected, in particular crimped, to leads. Precisely when heating filaments consisting of heating wires are used, the problem arises that the latter are too thin for direct connection, for which reason a filling element can be used for reinforcement, so that a good connection can be made to the leads. They can also be electrically connected to each other and/or reinforced by means of at least one filling element and electrically connected, in particular crimped, to each other. Leads mean conductors that are not provided for heating but act to connect the heating conductors to an energy supply (current or voltage source). Accordingly, they usually have a lower resistance than the heating conductor. A filling element means in the present case for example strand material, in particular also of a lead strand, that is added to a crimp connection for filling if the heating conductor is too thin for the said crimp connection.

If heating filaments made of heating wires are used, direct crimping of the ends to each other can be problematic, since they are usually too thin, so the provision of a filling element is suitable for increasing the diameter. It is likewise possible for the ends of the heating elements to be electrically connected to each other by at least one bridging element and/or reinforced by at least one filling element and electrically connected, in particular crimped, to each other by at least one bridging element. If such a bridging element is provided, series or parallel circuits of the heating elements can be produced. Otherwise, the ends of the heating elements can also be left open, so that a parallel circuit of the heating elements is produced, or short-circuited, so that a series circuit is produced. Both series and parallel circuits can be produced with the heating elements by means of suitable plug-in and/or wiring variants.

It has been proven further advantageous to accommodate the ends of the heating elements and/or connection or crimping points in an encapsulation that at least partially surrounds the line connector. Thermal insulation and/or mechanical and/or chemical protection for the ends of the heating elements accommodated in the encapsulation and the crimping or connection points can be created thereby. Such an encapsulation can be in the form of a housing, a shrink-fit hose or also be formed by overmoulding. If a housing is provided as the encapsulation, thermal insulation can be achieved by air enclosed therein.

If it turns out that there is too little material for the connection or crimping to create a secure connection, a filling element can also be provided here and introduced at least into the connection point. In particular, the line connector can be accommodated at least partially in a first receptacle of the encapsulation. The heating element ends can be arranged in at least one second receptacle of the encapsulation. The ends of the heating elements that are connected to each other or to leads or to a bridging element can thereby be accommodated such that they are protected from damage inside the encapsulation, for example a protective cap that at least partially surrounds the line connector.

With regard to the manner of crimping the heating element ends, an optimisation advantageously takes place between the thickness of the heating elements and the possible crimping process in order to obtain a low-resistance connection or crimping point.

To fix the position of the heating element after winding around the line connector and in particular before arranging the in particular crimped heating element ends in the corresponding receptacles of the encapsulation, the heating elements can be fixed in position on the line connector by means of at least one retaining element, in particular by means of hook-shaped retaining elements and/or a fixing tape. The retaining elements are also used in particular to guide the heating element ends towards the second receptacle of the insulating and/or protective housing when the latter is arranged on the line connector such that it at least partially surrounds the latter. An adhesive, fabric or adhesive-fabric tape can be used as the fixing tape.

It has proven further advantageous to coat the heating elements, in particular to provide an anti-corrosion coating in the form of a metallic coating, such as a nickel coating, a silver coating or a tin plating. Optimal protection and particularly good cost-effectiveness is achieved in the provision of a nickel coating, which is harder and more resistant, even during the manufacturing process of the heating element, than for example a tin plating. Furthermore, the heating elements can have an insulation layer, in particular a fluoropolymer or FEP insulation layer, that is, a fluorinated ethylene propylene layer sheath. Leakage currents, which can be caused by corrosion, can be prevented by providing such a coating. The presence of a fluoropolymer insulation coating has further proven advantageous, since a particularly low permeation can be achieved thereby when ammonia is present inside the media line. The heating elements can thus be protected thereby. Individual heating filaments can also be coated. A heating filament can comprise an inner fibre consisting of an aromatic polyamide, for example Kevlar® Detex 1580, it being possible for this inner fibre to have a diameter of 0.4 mm. Depending on the heating filament, only 3 to 4 heating wires or heating wire cores, it being possible for an individual core to have for example a diameter of 0.14 to 0.16 mm. The total outer diameter of the heating filaments can be 0.6 to 0.8 mm.

The heating elements can be arranged not only on the outside of the media line, but also on the inner side thereof if this is desired. However, in such a variant only one heating element, in particular one heating strand, is used for arrangement on the respective line connector.

BRIEF DESCRIPTION OF THE DRAWINGS

For a more detailed description of the invention, exemplary embodiments of the same are explained in more detail on the basis of the drawings in the following. In the figures.

DETAILED DESCRIPTION OF THE INVENTION

Figure 1A:
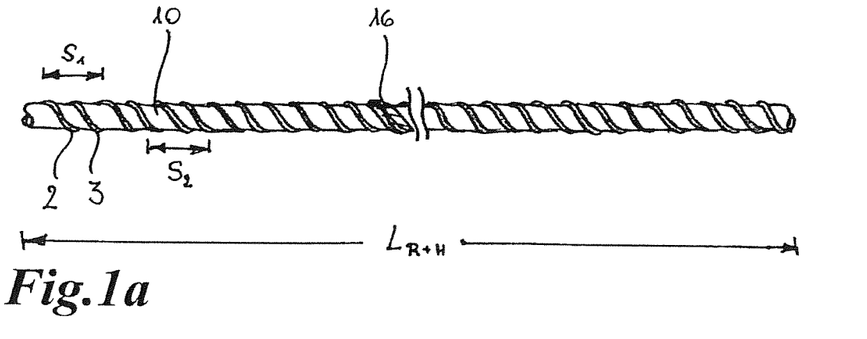
FIG. 1a shows a side view of a media line, around which two strands of a heating element are wound and which is cut to length in a first processing step according to the invention.

FIG. 1a shows a tubular or hose-shaped media line 10, around which two heating elements 2, 3 are wound. The media line 10 with the two heating elements, for example heating strands 2, 3, wound around it is a pre-assembled section of a long media line obtained from a continuous winding process of a tubular line. The first heating element 2 is wound with a pitch $S_1$ and the second heating element 3 is wound with a pitch $S_2$, it being possible for the two pitches to correspond with each other or also vary slightly in order to permit optimal heat input into the media line. The two heating elements 2, 3 are fastened on the outer face of the media line 10 by means of a fastening means 16, it being possible for the said fastening means to be an adhesive, fabric-adhesive or fabric tape. This is merely indicated in FIG. 1a.

Figure 1B:
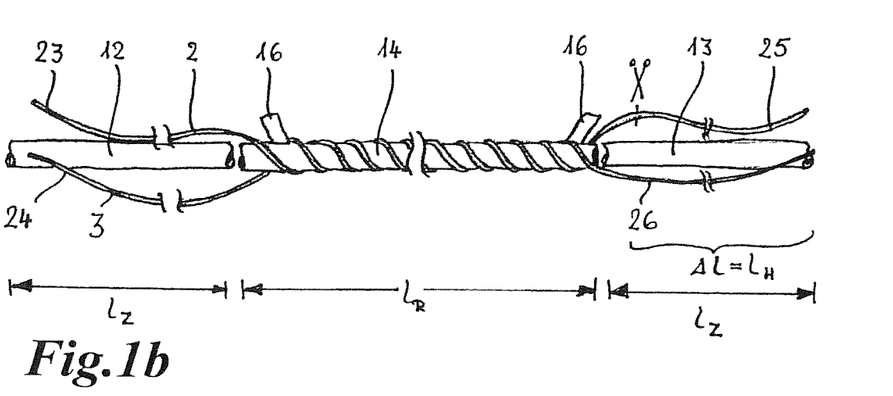
FIG. 1b shows a side view of the media line according to FIG. 1a in a second processing step according to the invention, wherein the strands are unwound from the media line in a section at the end and the media line is cut to length again.

The tubular or hose-shaped media line 10 according to FIG. 1a is cut to a length $L_{R+H}$. This length corresponds to the desired media line length $l_R$ plus an allowance length, on which the heating element length $l_H$ is wound, which is provided for winding around line connectors with which the media line is provided for connection to assemblies etc. in a vehicle. FIG. 1b shows the allowance lengths $l_Z$ and added media line ends 12, 13 provided at both ends of the media line 10 that has been cut to length. The free heating element ends 23, 24, 25, 26 are likewise shown in FIG. 1b. These four free heating element ends were previously arranged on the media line ends 12, 13 cut to length with the allowance length. After the heating element ends 23, 24, 25, 26 have been unwound from the two media line ends 12, 13, they are cut off from the central media line section 14, as indicated in FIG. 1b. The central media line section 14 has the desired media line length $l_R$ necessary for the respective use. For example, the media line length $l_R$ can in this case be 4.5 m or else only 0.2 m. This is dependent on the respective subsequent location and purpose of use of the heatable media line.

After the two media line ends 12, 13 have been cut off, the two end cut edges of the central media line section 14 are cleaned. Then a corrugated tube 15 is pushed axially onto the media line or the central media line section 14 thereof, the corrugated tube completely surrounding the media line section. A first line connector 17 is then attached to the one end of the central media line section 14 and a second line connector 18 is attached to the other end, in particular by pins, laser welding or other joining methods.

After the media line section 14 has been connected to the two line connectors 17, 18, that is, after the connection of the "fluid" part of the heatable media line, that is, the part through which the fluid can flow, the part provided for heating is arranged on the two line connectors. To this end, one of the heating elements 2, 3 is shortened at at least one end, since only one heating element is to be used to heat the line connector 17 or 18. As indicated in FIG. 1b, the heating element end 25 is shortened and the heating element end 26 is thus left longer than the heating element end 25 by the length difference Δl, since the heating element end 26 is to be used for arrangement on the line connector 18. At the other end of the heating elements 2, 3, one of the two ends 23, 24 can likewise be shortened in order to provide only one heating element for arrangement on the line connector 17. It is likewise possible to provide one of the line connectors with only one heating element and the other with two heating elements.

Figure 1C:
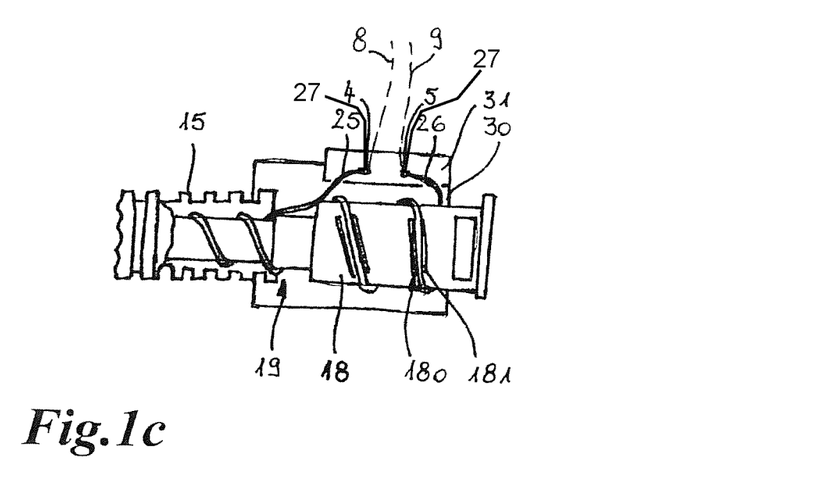
FIG. 1c shows a side view of an arrangement according to the invention of a heating element on the outside of a line connector.

In the example shown in FIG. 1c, the heating element 3 or its end 26 is wound around the line connector 18. No crimping points of the heating elements are provided in the transition regions 19 from the central media line section 14 to the respective line connector 17, 18. Rather, the heating element end 26 is wound continuously from the media line 10 over the line connector 18 or arranged on the latter. The shortened heating element end 25 is, as can be seen in FIG. 1c, routed directly from the media line 10 over the transition region 19 and connected to a lead 8, which is used for connection to a current or voltage source. The heating element end 26 is also connected to a lead 9, in particular only after winding around the line connector 18. Leads mean conductors that are not provided for heating but act to connect the heating conductors to an energy supply (current or voltage source). Leads usually have a lower resistance than the heating conductors.

The pitch of the winding on the media line and the two line connectors 17, 18 can vary, as indicated in FIG. 1c by way of example. As indicated in FIG. 1c, an approximately uniform pitch of the winding of the two heating elements 2, 3 is provided along the media line, the two heating elements 2, 3 are routed approximately parallel to the media line in the transition region 19, and another pitch of the wound heating element end 26 is provided on the line connector 18. This can also differ in the two line connectors 17, 18.

The respective heating element end 26 or 25, 23 or 24, as indicated in FIG. 1c, is held and fixed in position on the line connectors 17, 18 in guiding means 180 and/or retaining means. This facilitates reproducibly precise positioning and ensures long-term preservation thereof when the heatable media line is used in a vehicle such as a commercial vehicle, even under severe mechanical stress. Winding grooves on the outer side of the line connector(s) can for example be provided as guiding and/or retaining means, it being possible for the winding grooves to be delimited or formed by projecting ribs 181 or shape elements on the outer side of the line connector. This makes unambiguous positioning of the strands on the outside of the line connectors possible, so fixing with an adhesive, fabric-adhesive or fabric tape, as is provided along the media line, can be omitted here. If such winding grooves are not provided, fixing of the heating elements 2, 3 can of course also take place by means of for example an adhesive, fabric-adhesive or fabric tape or another type of fixing means in the region of the line connector 17, 18.

Figure 3:
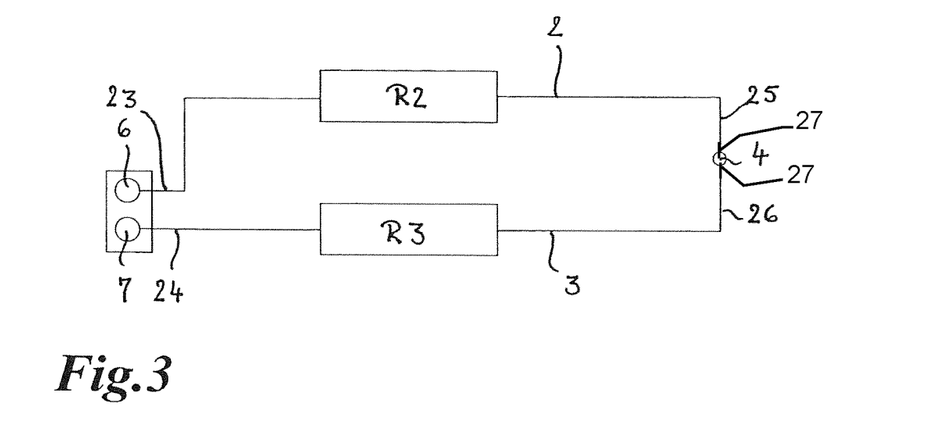
FIG. 3 shows an electrical equivalent circuit diagram of two series-connected heating elements having a lead terminal.
Figure 4:
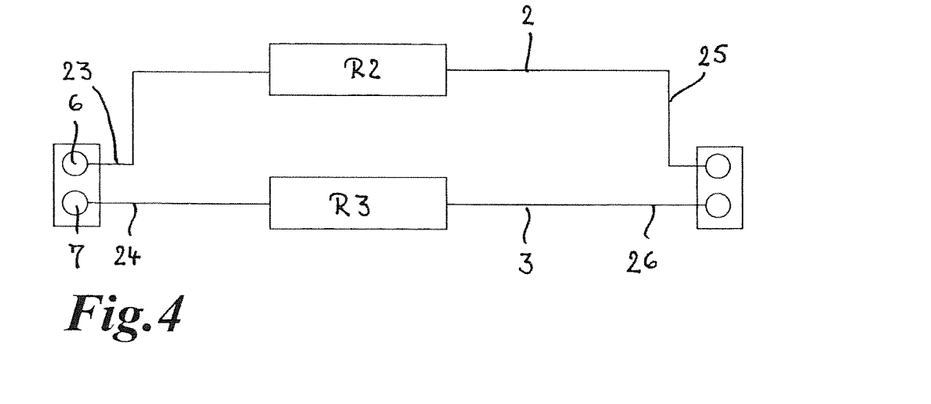
FIG. 4 shows an electrical equivalent circuit diagram of two parallel-connected heating elements having two lead terminals at the end.

The heating element ends 25, 26 can not only be connected to leads 8, 9 as mentioned, but also to each other. This produces a closed loop of the two heating elements 2, 3 having then only two open ends, namely the two heating element ends 23, 24, which are connected for their part to leads 8, 9. Such a configuration is indicated in FIG. 3 as a circuit diagram, while FIG. 4 shows a parallel circuit of the two heating elements 2, 3, in which the two heating elements 2, 3 are left open at the end and each provided with terminals for leads. The heating elements 2, 3 are in these two figures each indicated by their resistances R2, R3, which can be constructed identically or differently. In the series circuit of FIG. 3, the two connection points 6, 7 are provided at the heating element ends 23, 24 for connection to the leads 8, 9 and the two heating element ends 25, 26 are connected to each other via a crimping point 4.

The ends 23, 24, 25, 26 of the heating elements 2, 3 can be electrically connected to each other by means of a bridging element. This is not shown however in the figures. If the diameter of the heating elements is too small, a filling element can be used for reinforcement, not only when a bridging element is provided, but also when the heating elements are connected to each other and/or to leads.

As indicated in FIG. 1c and also 1d, in the latter of which the fully assembled heatable media line 1 is shown, the two line connectors 17, 18 are accommodated in a respective encapsulation 29, 30. In the embodiment according to FIG. 1c, the encapsulation 30 has a receiving section 31 for connection and crimping points 4, 5, that is, connection points between the two heating element ends 25, 26 and the two leads 8, 9 or the two heating element ends 25, 26, when these are connected to each other to form a series circuit, as mentioned above. The receiving section 31 is indicated as a slightly protruding part of the line connector 18 in FIGS. 1c and 1d, but can also be integrated in the encapsulation, when the latter is shaped differently, in such a manner that the receiving section cannot be seen from the outside.

The encapsulation 29 surrounding the line connector 17 has a branching piece 32, by means of which the leads 8, 9 can be routed on the outside of the encapsulation 29. A sheath means of the leads can be connected to the branching piece or accommodated partially therein, such as a corrugated tube 89. In this case, the leads can thus be guided out in a kink-proof and stable manner to connect the heating element to a current or voltage source. This can be seen in FIG. 1d, in which the leads are provided with a corresponding plug-in connector 80 for connection to a current or voltage source. If leads 8, 9 are likewise connected to the heating element ends 25, 26 at the ends, the said leads can either be guided out of the encapsulation 30 through a corresponding branching piece, or they can be guided along the media line 10 to the encapsulation 29 and out through the branching piece 32 there. The fact that the lead is guided out of the encapsulation in a protected manner means that the connection between the lead and the heating element can be fixed and shocks, which can occur for example during operation in particular with installation in a commercial vehicle, no longer result in undesirable detachment of the heating element from the lead or this can be prevented as much as possible.

Figure 1D:
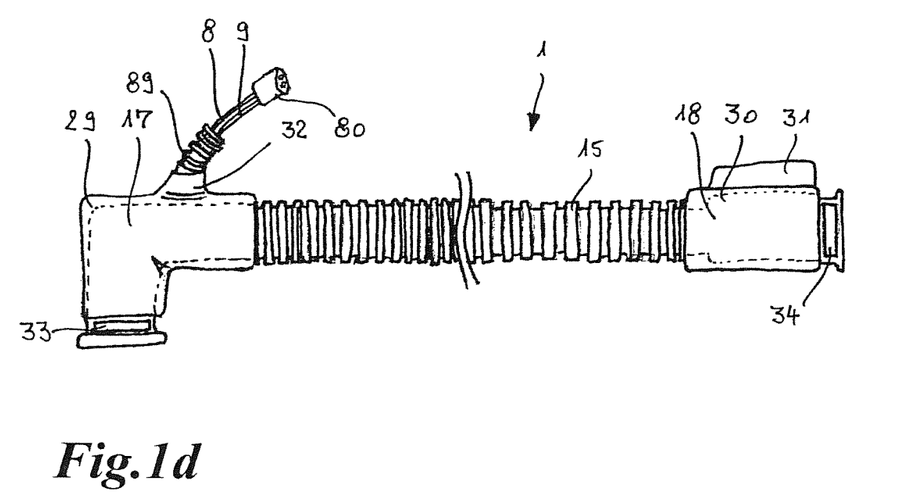
FIG. 1d shows a side view of the fully assembled heatable media line according to the invention, provided with an encapsulation on the outside.

As can further be seen in FIG. 1d, the two encapsulations 29, 30 each have end connection openings 33, 34 for inserting retaining elements for holding back a connector inserted therein, a coupling or a plug-in connector for connection to an assembly or other lines.

When the media line is being wound, the pitch can vary slightly over the longitudinal extent of the media line, which is produced by exhausting the tolerance range and providing a pitch within a tolerance. It is likewise possible during continuous winding from one end of the media line to the other to provide a deliberate variance in the pitch to create a heating element reserve or else to produce an input of heat into the media line that differs over the longitudinal extent of the latter. A variable pitch can partially be provided depending on the point at which a particularly high input of heat is required or a shallower pitch can be provided in the case of a higher desired input of heat. With a pitch $S_1$, $S_2$ of 10 to 40 mm, in particular 20 to 30 mm, a heat input of 20 to 8 W/m, in particular 14 W/m, can be provided in the region of the media line 10 and of 1 to 4 W, in particular 1.5 W, can provided at the line connectors 17, 18 when only one heating element 2 or 3 is wound around the same or arranged on the same.

The heating power of the heating elements between the media line and the line connectors can then be adjusted as desired if three heating elements are used instead of two, it only being possible to use one for arrangement on one of the two line connectors 17, 18 and the remaining two heating elements only extending along the media line 10, and crimping or connection points for connecting the heating elements being provided in each case in the transition region of the media line to the line connector provided with the third heating element.

Figure 2A:
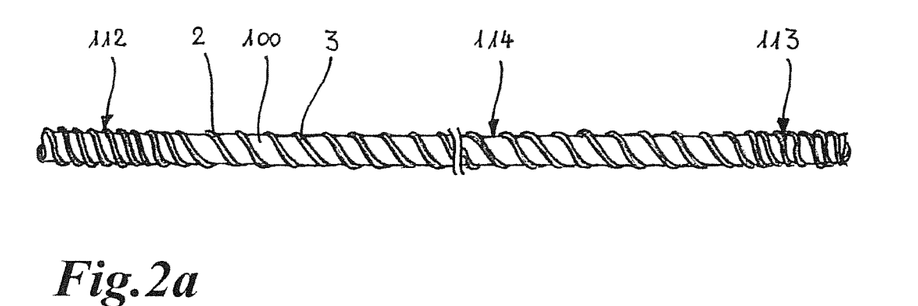
FIG. 2a shows a side view of a media line according to the invention in a second embodiment.

FIG. 2a shows a side view of a design variant of the pre-assembled media line 100, in which the pitch of the winding with the heating elements 2, 3 varies over the length of the media line. A shallower pitch of the winding is provided at each of the two media line ends 112, 113 than in the central media line section 114. In this case a selective winding or supply of heating elements is thus provided, the media line 100 being pre-assembled in such a manner that the heating elements are each wound with a shallower pitch in some sections in order to have a sufficient reserve for winding around the line connectors after media line ends have been cut off for further assembly to form a heatable media line. The advantage of this design variant compared to that shown in FIGS. 1a and 1b is that the media line ends 112 and 113 are shorter than the media line ends 12 and 13, so material, that is, media line, can be saved in this case.

Figure 2B:
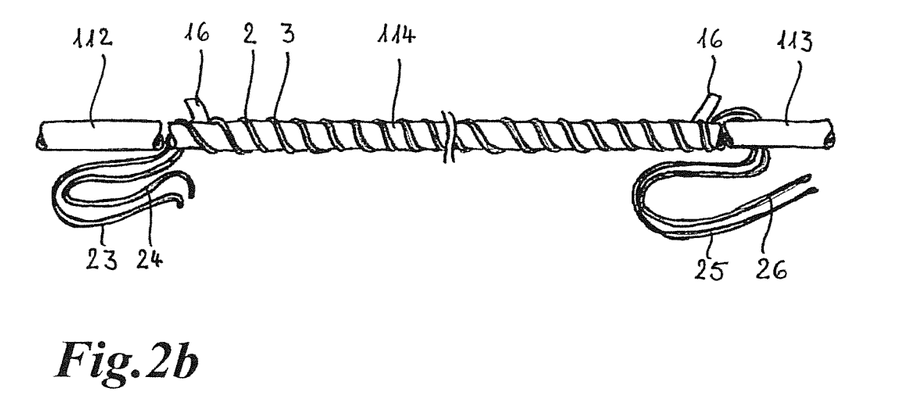
FIG. 2b shows a side view of the media line according to FIG. 2a having unwound heating elements at the end.

The further assembly of such a pre-assembled media line 100 takes place in that cutting always takes place in the region of the shallower winding pitch, so only shorter parts of the tubular or hose-shaped media line 100 are cut off and have to be discarded compared to the solution according to FIG. 1a, in which the media line ends 12, 13 to be cut off and discarded are larger than the media line ends 112, 113 according to FIG. 2b. The respective allowance length $l_Z$ is thus shorter in the embodiment according to FIG. 2a than in the embodiment according to FIG. 1b. Owing to the winding with shallower pitch, more heating element length can be accommodated on a shorter media line length.

Figure 2C:
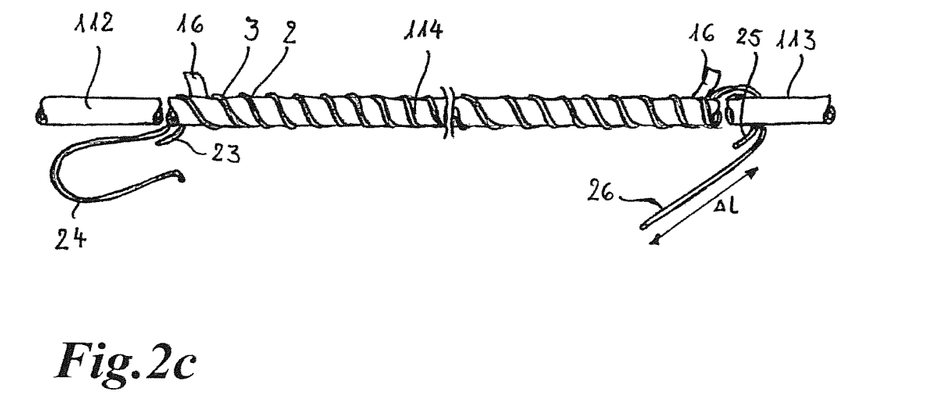
FIG. 2c shows a side view of the media line according to FIG. 2a having unwound heating elements at the end, wherein the one heating element is shortened.

The further assembly of the media line 100 or of the central media line section 114 according to FIG. 2b can take place as described in relation to FIGS. 1a to 1d. In FIG. 2c, the shortening of the one heating element end 25 or also of the heating element end 23 is indicated, as is the resulting length difference Δl of the heating elements ends 25 and 26 or 23 and 24, the heating element end 26 or 24 in turn being used for arrangement on the line connector 18 or 17.

Instead of the provision of leads connected to the heating element ends, the heating element ends themselves can also in principle be guided into a plug-in connector and by means of this be connected directly to a current or voltage source. Furthermore, such a connection can also be integrated directly in the line connector or the encapsulation.

In addition to a thermal conductivity of the line connector, it can also come down to a particular temperature resistance in the hot region of the assembled heatable media line, that is, in the region in which the latter is arranged in the vicinity of apparatuses that give out a lot of heat, such as an exhaust train or an engine, in contrast to the cold region, which itself gives off little or no heat, so that heating of this region of the assembled media line is necessary. Advantageously, a material that is more temperature-resistant compared to the material used for the line connector in the cold region can be used for the line connector arranged in the hot region, for example a temperature-resistant polymer, such as PPA (polyphthalamide). It furthermore proves advantageous if the media line also consists of a more temperature-resistant material in the hot region. The provision of a two-part line is suitable in this case. The one line connector or quick connector in the hot region and the part of the media line there can thus consist e.g. of PPA, and the remaining media line arranged in the cold region, as well as the line connectors there, which can be formed as plug-in connectors, can consist of a less temperature-resistant material such as polyamide 12. The line connector there can also consist of e.g. PA12 GF30 or a polyamide 6. When using a hose-like media line, the same can consist of EPDM (ethylene propylene diene monomer) in combination with a line connector made from PPA in the hot region.

The part of the media line that consists of a temperature-resistant material, such as PPA, can be e.g. wound with a fabric tape and accommodated in a sheath or corrugated tube consisting of temperature-resistant TPC (thermoplastic polyester elastomer). A crimp connection in the hot region consists e.g. of the alloy K-75 and a shrink-fit hose consisting of FEP (fluorinated ethylene propylene). The remaining media line (in the cold region) consisting of PA 12 can be wound with standard tape and surrounded by a sheath or corrugated tube consisting of modified polypropylene. The crimp connection in this cold region can consist of CuZn30 and a shrink-fit hose consisting of XPE (radiation-cross-linked polyethylene).

PPA is particularly suitable for higher temperatures and has a very good permeation behaviour, thus is barely permeable even to aggressive medium flowing through the heatable media pipeline.

In addition to the design variants of assembled heatable media lines mentioned above and shown in the figures, numerous others can be formed, in which the media line is provided in each case with at least two heating elements arranged on the outside thereof and with at least one line connector, wherein, in order to heat the at least one line connector, only one of the heating elements is arranged on the latter such that it at least partially surrounds the same. In particular, any desired combinations of the design variants mentioned above and shown in the figures can be provided.

REFERENCE LIST

1 Assembled heatable media line
2 Heating element
3 Heating element
4 Crimp point
5 Crimp point
6 Connection point
7 Connection point
8 Lead
9 Lead
10 Media line
12 Media line end
13 Media line end
14 Central media line section
15 Corrugated pipe
16 Fastening means
17 First line connector
18 Second line connector
19 Transition region
23 Heating element end
24 Heating element end
25 Heating element end
26 Heating element end
29 Encapsulation
30 Encapsulation
31 Receiving section
32 Branching piece
33 Connection opening
34 Connection opening
80 Plug-in connector
89 Corrugated tube
100 Media line
112 Media line end
113 Media line end
114 Central media line section
180 Guiding means
181 Rib
$S_1$ Pitch, heating element 2
$S_2$ Pitch, heating element 3
$l_{R+H}$ Length of media line in first manufacturing step
$l_R$ Media line length
$l_H$ Heating element length
$l_Z$ Allowance length
Δl Length difference
R2 Resistance, heating element 2
R3 Resistance, heating element 3

What is claimed is:
1. An assembled heatable media line, comprising:
a media line with at least two heating elements arranged on and in direct contact with an exterior surface thereof and having at least one line connector,
wherein to heat the at least one line connector, only one of the at least two heating elements is additionally arranged on and in direct contact with the line connector, such that the only one of the at least two heating elements is routed from the media line and is wound around or arranged on the line connector and is the only heating element provided for heating the line connector, wherein the only heating element provided on and in direct contact with the at least one line connector projects from the media line with a greater length (Δl) than any other of the at least two heating elements, wherein each of the at least two heating elements have no crimping and no connection points in a transition region between the media line and the at least one line connector, with one of the at least two heating elements routed directly from the media line over the transition region and either left open, connected in series to the other one of the at least two heating elements, or connected to a lead, and wherein the at least two heating elements consist of a single wire, strand or filament along their respective lengths.

2. The assembled heatable media line according to claim 1, wherein a pitch ($S_1$, $S_2$) of a winding of the at least two heating elements on the media line varies by sections, wherein the at least two heating elements are wound around the media line with a shallower pitch in some sections than in a remaining section of the sections.

3. The assembled heatable media line according to claim 2, wherein the pitch ($S_1$, $S_2$) of the winding on the media line is 10 to 40 mm.

4. The assembled heatable media line according to claim 1, wherein a heating power of the at least two heating elements along the media line is 20 to 8 W/m, and at the at least one line connector 1 to 4 W.

5. The assembled heatable media line according to claim 4, wherein the at least two heating elements consist of three heating elements which are provided and arranged on and in direct contact with the exterior surface of the media line.

6. The assembled heatable media line according to claim 1, wherein the only heating element provided on and in direct contact with the line connector is wound in a spiral or meandering manner around the line connector or arranged in an elongate manner around the line connector.

7. The assembled heatable media line according to claim 1, wherein the media line is a hose or tube.

8. The assembled heatable media line according to claim 1, wherein ends of the at least two heating elements are reinforced by at least one filling element.

9. The assembled heatable media line according to claim 8, wherein the ends of the at least two heating elements are accommodated in an encapsulation, and wherein the encapsulation at least partially surrounds the line connector.

10. The assembled media line according to claim 1, wherein the at least two heating elements have different resistances ($R_2$, $R_3$).

11. The assembled heatable media line according to claim 3, wherein the pitch ($S_1$, $S_2$) of the winding on the media line is 20 to 30 mm.

12. The assembled heatable media line according to claim 4, wherein a heating power of the at least two heating elements along the media line is 14 W/m, and at the at least one line connector is 1.5 W.

13. The assembled heatable media line according to claim 5, wherein the three heating elements consist of three heating strands.

14. The assembled heatable media line according to claim 7, wherein the media line is formed as a polyimide tubular line.

15. An assembled heatable media line, comprising:
a media line with at least two heating elements arranged on and in direct contact with an exterior surface thereof and having at least one line connector, wherein each of the at least two heating elements have no crimping and no connection points in a transition region between the media line and the at least one line connector, wherein to heat the at least one line connector, only one of the at least two heating elements is additionally arranged on and in direct contact with the line connector, such that the only one of the at least two heating elements is routed directly from the media line over the transition region and is wound around the line connector and is the only heating element provided for heating the line connector, wherein the only heating element provided on and in direct contact with the at least one line connector projects from the media line with a greater length (Δl) than any other of the at least two heating elements, wherein the only heating element provided on and in direct contact with the at least one line connector is either connected in series to any other of the at least two heating elements, left open, or connected to a lead, and wherein the at least two heating elements consist of a single wire, strand or filament along their respective lengths.

* * * * *